(12) United States Patent
Burström (10) Patent No.: US 7,415,501 B2
(45) Date of Patent: Aug. 19, 2008

(54) ONLINE GRAPHICAL MESSAGE SERVICE

(75) Inventor: Stefan Burström, Lund (SE)

(73) Assignee: Anoto AB, Lund (SE)

( * ) Notice: Subject to any disclaimer, the term of this patent is extended or adjusted under 35 U.S.C. 154(b) by 1465 days.

(21) Appl. No.: 09/813,117

(22) Filed: Mar. 21, 2001

(65) Prior Publication Data

US 2001/0055036 A1   Dec. 27, 2001

Related U.S. Application Data

(60) Provisional application No. 60/207,881, filed on May 30, 2000.

(30) Foreign Application Priority Data

Mar. 21, 2000   (SE) .................................... 0000944

(51) Int. Cl.
*G06F 15/16*   (2006.01)
(52) U.S. Cl. ..................................... 709/205
(58) Field of Classification Search ......... 709/223–225, 709/227–229, 231, 205; *H04N 7/15*
See application file for complete search history.

(56) References Cited

U.S. PATENT DOCUMENTS

| | | | |
|---|---|---|---|
| 5,194,852 | A | 3/1993 | More et al. |
| 5,661,506 | A | 8/1997 | Lazzouni et al. |
| 5,793,365 | A | 8/1998 | Tang et al. |
| 5,852,434 | A | 12/1998 | Sekendur |
| 6,661,931 | B1 * | 12/2003 | Kawada ..................... 382/276 |

FOREIGN PATENT DOCUMENTS

| | | | |
|---|---|---|---|
| EP | 0893698 A1 | | 1/1999 |
| GB | 2282506 A | | 4/1995 |
| GB | 2282506 | * | 5/1995 |
| SE | WO 01/26032 | * | 4/2001 |
| WO | WO 0000928 | | 1/2000 |
| WO | WO 0073983 A1 | | 12/2000 |
| WO | WO 0116691 A1 | | 3/2001 |
| WO | WO 0126032 A1 | | 4/2001 |
| WO | WO 01 61449 A2 | | 8/2001 |

* cited by examiner

*Primary Examiner*—Jason Cardone
*Assistant Examiner*—Mitra Kianersi
(74) *Attorney, Agent, or Firm*—Birch, Stewart, Kolasch & Birch, LLP (57) ABSTRACT

A system and method for achieving an electronic information service (also called an online graphical message service) hosted by a computer system (e.g., a server) connected to a network. Remote users can write information into and read information from the information service over the network. In response to a request from a first user, the service may create a first information object that comprises a partial area of a virtual pixel area. The virtual pixel area may include information written by the remote users. Then, the service may transmit the first information object via the network to the first user. Later, the service may receive a second information object from the first user corresponding to at least part of the partial area of the virtual pixel area. The second information object may include modifications the first user made to the partial area of the virtual pixel area. The service may then update the virtual pixel area utilizing the received second information object.

39 Claims, 5 Drawing Sheets

ONLINE GRAPHICAL MESSAGE SERVICE

CROSS-REFERENCE TO RELATED APPLICATIONS

This application claims priority benefits based on Swedish Patent Application No. 0000944-9, filed Mar. 21, 2000, and U.S. Provisional Application No. 60/207,881, filed May 30, 2000, the technical disclosures of both of which are hereby incorporated herein by reference.

1. Field of the Invention

The invention relates generally to communications over a computer network and, more specifically, to online message exchange services.

2. Background of the Invention

A large number of interactive information services are offered to users connected to the Internet. These Web services may enable each user to write information to the service so other users can read that information. Likewise, each user may be able to read the contributions of other users. Web services providing this type of customer interaction include "chat rooms" and message boards. When writing information to such services, a user may comment on contributions of other users or add further information on a topic addressed by others, thereby participating in a "thread" of related comments.

While users posting messages in a thread on a "message board" often do not expect immediate responses, users of "chat rooms" often expect to receive responses more in real time. This may involve the frequent and continued addition of new messages from users. The most recently contributed message may be added at the bottom of the service's page and earlier messages may be scrolled upwards on the screen.

Chat rooms have become very popular even though they have a number of limitations. If new contributions come in at a fast rate, the earlier contributions scroll quickly out of sight. This can make it difficult to follow a conversation on the chat page. It can also be difficult to tell which of the earlier contributions a later contribution is commenting on, even though a note to this effect can be made at the start of the later contribution. This is because there can be several other contributions between a contribution making a comment and the contribution to which the comment is referring.

If a chat room is very busy, a conversation on it can be very difficult to follow. To limit how crowded a chat room is, Web sites offering chat services typically offer multiple "chat rooms," each directed to a particular interest or age group.

Known chat pages are based on written text and are therefore principally a verbal means for expression. However, there are examples of the use of non-verbal symbol combinations. Known as "emoticons," character combinations such as ":-)" and ":-(" may be used to indicate moods and the like, although emoticons provide only a limited contribution to the ability of users to communicate online. Thus, there is a need in the art for improved methods of enabling remote users to communicate over a computer network.

SUMMARY OF A FEW ASPECTS OF THE INVENTION

Generally described, the invention includes an electronic information service in a computer system connected to a network. The service may create a first information object comprising a partial area of a virtual pixel area into which a plurality of users can write information and from which the plurality of users can read information. The service may then transmit the first information object via the network to a first user included in the plurality of users. After receiving a second information object from the first user corresponding to at least part of the partial area of the virtual pixel area, the service may update the virtual pixel area utilizing the second information object.

The invention also includes an online graphical message service. The service receives from a first user a request for at least a portion of a graphical image. The service then transmits the portion of the graphical image over a computer network to the first user. The service may then receive over the computer network a modification of the graphical image from the first user. Then, the service may update the graphical image to include the modification. Moreover, the service may make the updated graphical image available for viewing and modification by a second user.

In another embodiment of the invention, an electronic information service in a computer system connected to a network may receive a message from a user. The service may then receive from the user an indication of a position for the message on a virtual area having a matrix of pixels. After placing the message in the position on the virtual area, the service may make at least portions of the virtual area available for viewing and modification by a second user.

Another embodiment of the invention provides for participation of a first user in an online graphical message service. The first user's computer may send a request over a computer network to a computer server for at least a portion of a graphical image that is available for modification and viewing by a plurality of users. The first user's computer may then receive the portion of the graphical image over the computer network and display it to the first user, who is included in the plurality of users. The first user's computer may then receive a modification of the portion of the graphical image from the first user, after which it may send the modification over the computer network to the computer server.

The foregoing summarizes only a few aspects of the invention and is not intended to be reflective of the full scope of the invention as claimed. Additional features and advantages of the invention are set forth in the following description, apparent from the description, or may be learned by practicing the invention. Moreover, both the foregoing general description and the following detailed description are exemplary and explanatory and are intended to provide further explanation of the invention as claimed.

DETAILED DESCRIPTION OF PREFERRED EMBODIMENTS

Generally described, the invention includes an electronic information service (also called an online graphical message service) hosted by a computer system (e.g., a server) connected to a network. Remote users can write information into and read information from the information service over the network. In response to a request from a first user, the service may create a first information object that comprises a partial area of a virtual pixel area. The virtual pixel area may include the information written by the remote users. Then, the service may transmit the first information object via the network to the first user. Later, the service may receive a second information object from the first user corresponding to at least part of the partial area of the virtual pixel area. The second information object may include modifications the first user made to the partial area of the virtual pixel area. The service may then update the virtual pixel area utilizing the received second information object.

Figure 1:
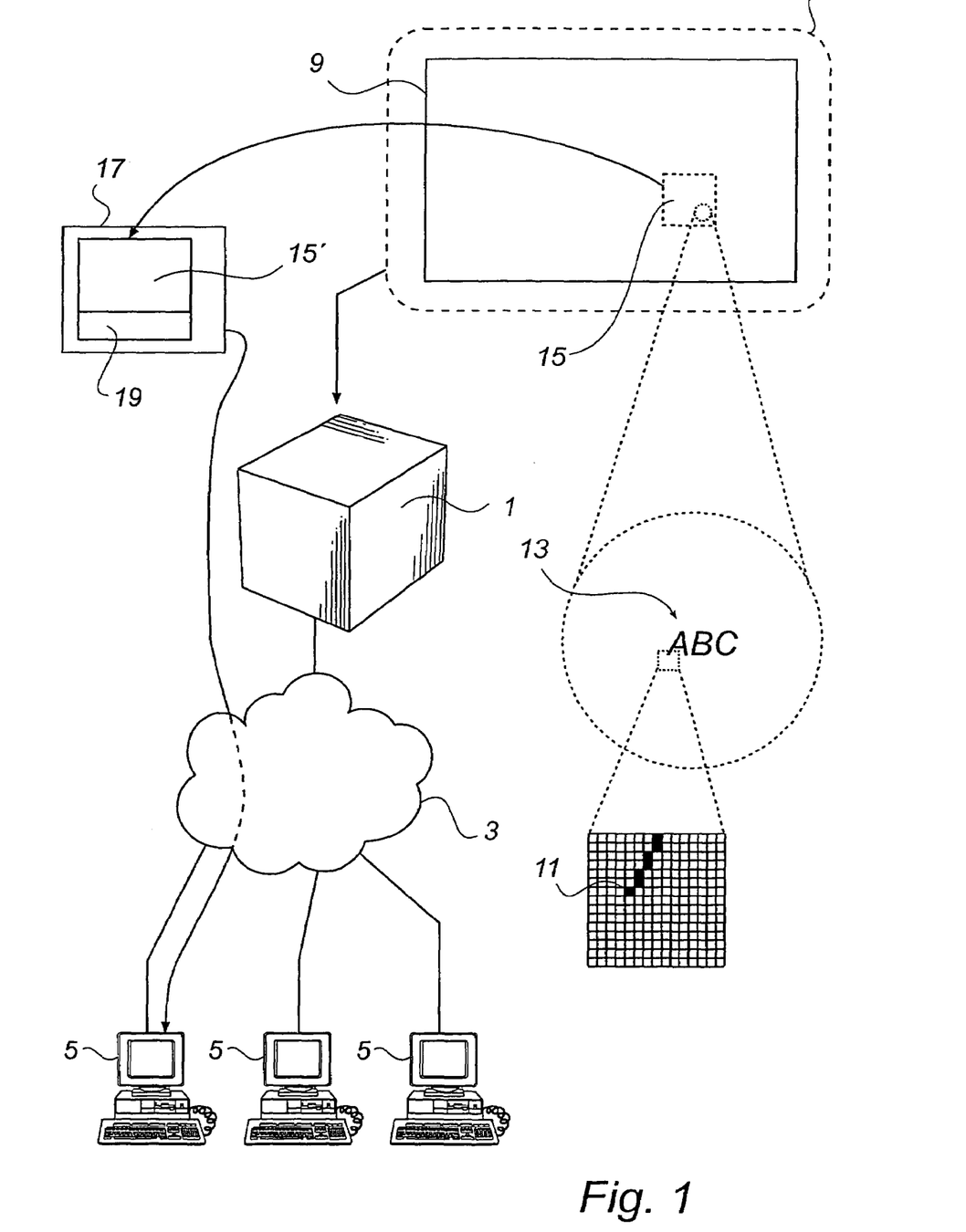
FIG. 1 is an overview of an exemplary embodiment of an online graphical message service consistent with the present invention, and the computing environment it which it may operate.

FIG. 1 illustrates an exemplary online graphical message service and the computer environment in which it may operate. The computer system (server) 1 may be connected via a computer network 3 such as the Internet to the personal computers 5 of a number of users. These users may communicate with the computer system 1 to read information from and write information to an electronic information service 7 hosted by the computer system. The information service 7 may be designed as a virtual pixel area 9, described below in greater detail.

In one embodiment of the invention, a user can download a certain part 15 of the pixel area 9, read the messages on this partial area 15, and add his own message to it. Then, the user may submit this modified partial area to the server 1, after which the service 7 may update the pixel area 9 with the added message. Use of the pixel area 9 may also enable the service 7 to store messages received in a graphical format rather than the more limiting text format.

The pixel area 9 may be a two-dimensional matrix of pixels 11. They may assume at least two states, "one"/"black" and "zero"/"white." The size of the pixel area 9 may be larger than the pixel area of a normal computer monitor screen. A user equipped with a normal personal computer 5 may be able to see only a small part of the pixel area 9 at any time in full resolution. The large format of the pixel area 9 allows room, however, for a large number of messages 13 of various kinds at any particular time.

A user who uses the service may ask to view various partial areas in various resolutions. Thus, a user may start a session by viewing the whole area 9 at very low resolution. The messages which are entered on the area may then not be legible. Instead, the areas with messages may appear as darker regions in the image that the user sees. A pixel on the user's screen may in this case correspond to many more pixels in the virtual area. The user may then mark a smaller part of the area that he wants to look at more closely.

The user's computer may send a request to view the desired area in more detail to the computer system 1, which in response may create and retransmit a new file with the detailed content of the desired area. The user may also jump around in the area, perhaps using the arrow keys on his personal computer, until he finds a place in the virtual pixel area 9 where he wants to write a message. The system may only permit writing in images shown to the user in the highest resolution, when there is a one-to-one relationship between pixels in the virtual pixel area 9 of the computer system 1 and pixels in the image which are shown on the user's personal computer.

A background image may be superimposed on the virtual pixel area 9 to enable a user viewing partial images derived from the virtual pixel area to more easily orient himself. This may produce intuitive "chat rooms" directed to topics related to various objects in the background image.

Figure 2:
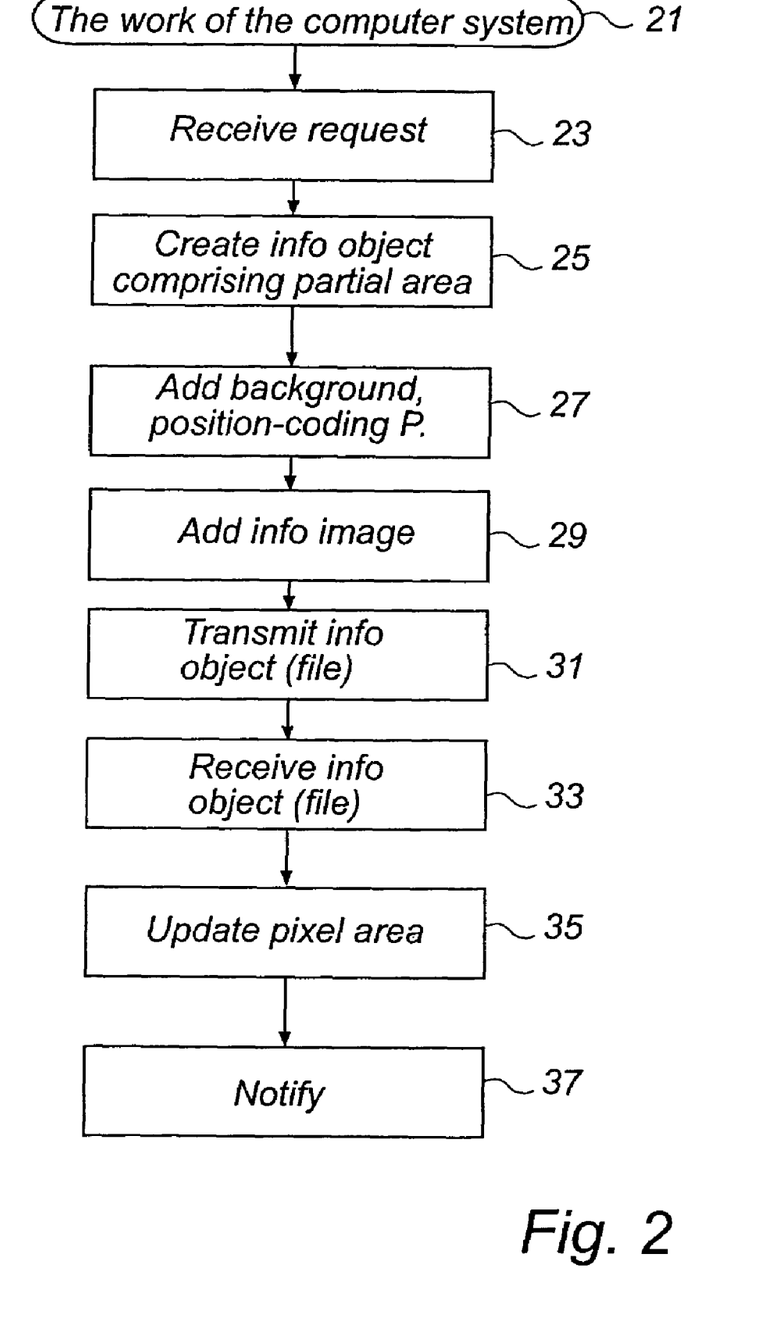
FIG. 2 is a flow chart illustrating the operation of an online graphical message service in accordance with an exemplary embodiment of the present invention.

FIG. 2 is a flow chart illustrating the steps in an exemplary method for operating an online graphical message service. Such operation may be directed by a computer program that contains steps causing the server 1 to perform certain operations. In step 23, the server 1 receives a request from a user via the network 3 for the transmission of a particular part 15 of the virtual pixel area 9. In step 25, the server 1 may create an information object 17 in the form of a file that contains a copy 15' of the requested partial area 15 of the virtual pixel area 9 of the server.

If a partial area of the pixel area has been requested that is larger than the user's monitor screen can display in full resolution, the system may handle this in various ways. The partial area may be incorporated in its existing state in the created information object 17, or the resolution of the image area may be reduced so that it can be displayed in its entirety on the monitor screen of the user making the request. In the first case, the user's computer display may display only parts of the file 17 at any time, and the user may use the arrow keys on his personal computer 5 to manipulate the portion of the file 17 displayed.

In step 27, a superimposed position-coding pattern and/or a background image may be added to the file 17. Alternatively, these could be incorporated in the virtual pixel area 9 as part of the image selected for the file 17. The use of the position-coding pattern will be described in greater detail below.

In step 29, an information image 19 may be added to the information object 17. This may be superimposed, or it may be combined with the copy 15' of the requested partial area 15 to form a composite image comprising the two images. The added information image 19 may be an advertising message (such as a banner ad) or other information that the owner of the computer system 1 wants to transmit to the user. The information image may be selected based on parameters (if available to the computer system 1) specific to the user, such as his age, hobbies, and the like.

In step 31, the computer system 1 may transmit the created information object 17 to the user via the network 3. The user may then view the messages written in the requested partial area and the information included in the added information image 19. Using various input devices, the user may then add information himself to the image viewed. The information the user adds may include text or drawings.

If the user has made an addition to the partial area in the information object 17 and wants this to be incorporated in the virtual pixel area 9 of the computer system 1 so that it is available for viewing by other users of the service, a second information object may be sent back to the computer system 1. The second information object may be the information object 17 sent to the user but with the modifications, or it may be a new information object containing the modifications. The second information object may contain only the part of the partial area 15 that has been modified, or it may contain only a description of the modifications but none of the original content.

In step 33, the computer system 1 may receive the second information object from the user. The received second information object may contain an indication of which partial area of the virtual pixel area 9 the second information object modifies.

Thereafter, the computer system 1 may update the virtual pixel area 9 in step 35 using the second information object so that the user's modifications (or message) can be viewed by other users of the service. In step 37, the computer system may notify another user that a partial area he wanted to monitor has been updated.

Figure 3:
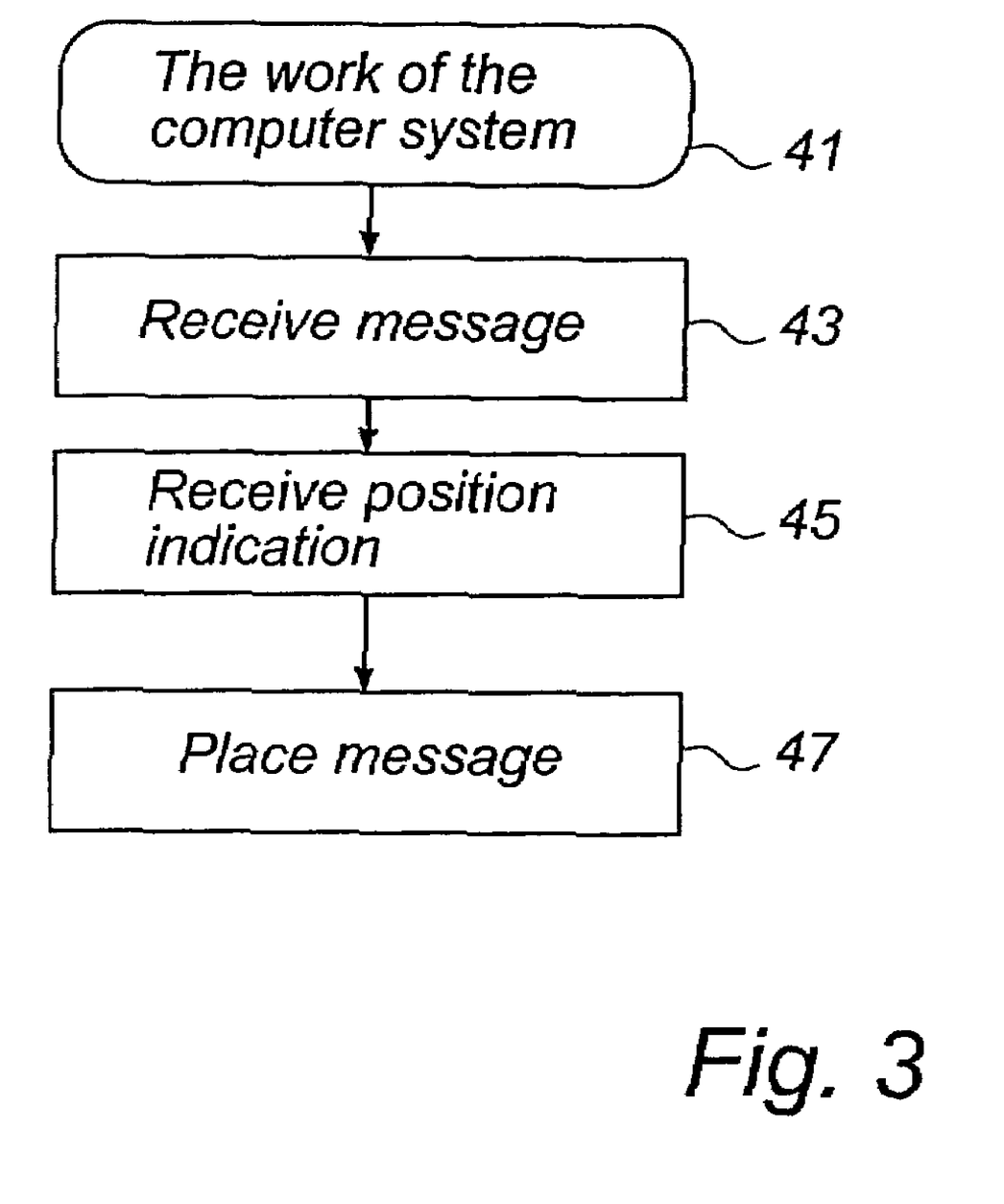
FIG. 3 is a flow chart illustrating the operation an online graphical message service in accordance with another exemplary embodiment of the present invention.

FIG. 3 is a flow chart 41 illustrating the operation of the server 1 in accordance with another exemplary embodiment of the message service. As with the previous embodiment, messages from remote users may be stored in a virtual pixel area 9. In step 43, the server 1 may receive a message from a remote user. In step 45, an indication of a position on the virtual pixel area may be received from the user. This position may identify where on the virtual pixel area the user wants to place the message. In step 47, the server 1 may place the message in the location on the virtual pixel area 9 identified by the indication of the position.

Figure 4:
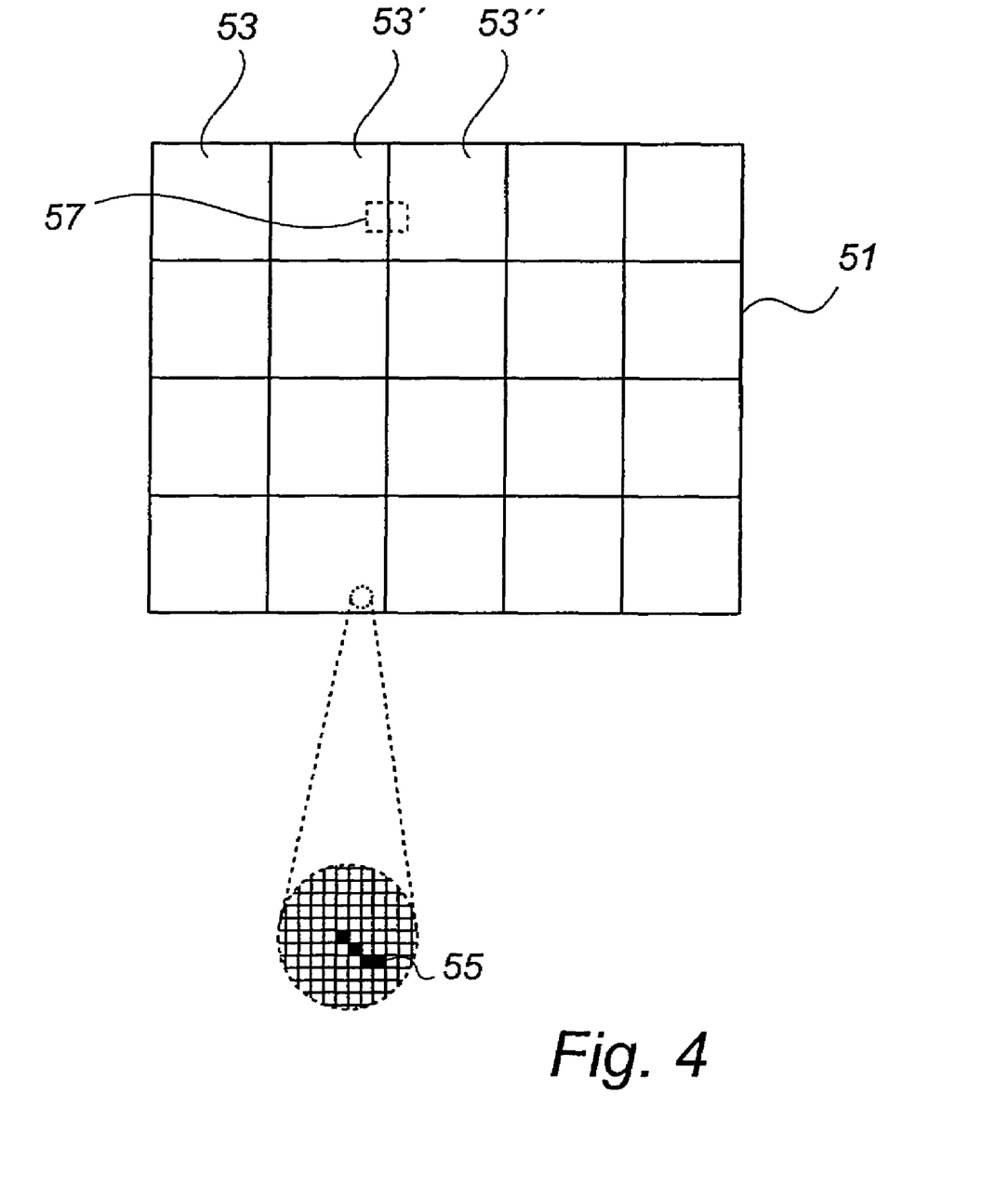
FIG. 4 illustrates a method of storing a virtual pixel area in accordance with an exemplary embodiment of the present invention.

FIG. 4 illustrates an exemplary method for maintaining and storing a virtual pixel area 51. The area 51 may comprise a number of files 53, 53', 53", and so on, each stored in a digital storage medium in the computer system 1. Each file 53 may represent a two-dimensional matrix of pixels 55. In such an embodiment, a value of "one" for a pixel may indicate that pixel is black, while a value of "zero" may indicate that pixel is white. Pixels, however, may assume more values and thereby represent colors and gray scales.

Each pixel may be associated with a time value that determines how long a pixel stays active. In this way, it may be possible to delete messages after a certain period of time in order to prevent the virtual pixel area from being completely filled up, which might prevent the acceptance of new messages. It is also possible to make a message fade away after a certain period of time by making the pixels incorporated in it assume increasingly paler gray-scale values.

The virtual pixel area may consist of a matrix in more than two dimensions, thereby enabling several layers. One layer may contain a background image to display to users. Users may not be able to write in such a background image layer; in this case, they may write information in a drawing layer superimposed on the background layer upon display.

By representing the virtual area 51 with a number of graphical files 53, 53', 53", it may not be necessary to go through the trouble of manipulating a very large file to update the virtual area. Instead, a set of small files may be updated when a user adds information to the virtual pixel area 51. For updating a partial area 57 of the virtual area 51, for example, only files 53' and 53" may need to be updated, even though the pixel area 51 may have hundreds of files. This permits speedy updating of the virtual pixel area 51.

The file format of the pixel areas 53 may be a compressed graphical format, such as .jpg or .gif. Alternatively, it may be a non-compressed format, such as .bmp or tiff. The advantage of a non-compressed format is that non-compressed files are quicker to open for editing when updating the pixel area. There are not great benefits in compressing the files 53, as they are not transmitted over narrow-band channels.

But the information object 17, which is created at the request of the user out of a partial area of the virtual pixel area, may be transmitted over the computer network 3. Such files may thus benefit from compression.

Figure 5:
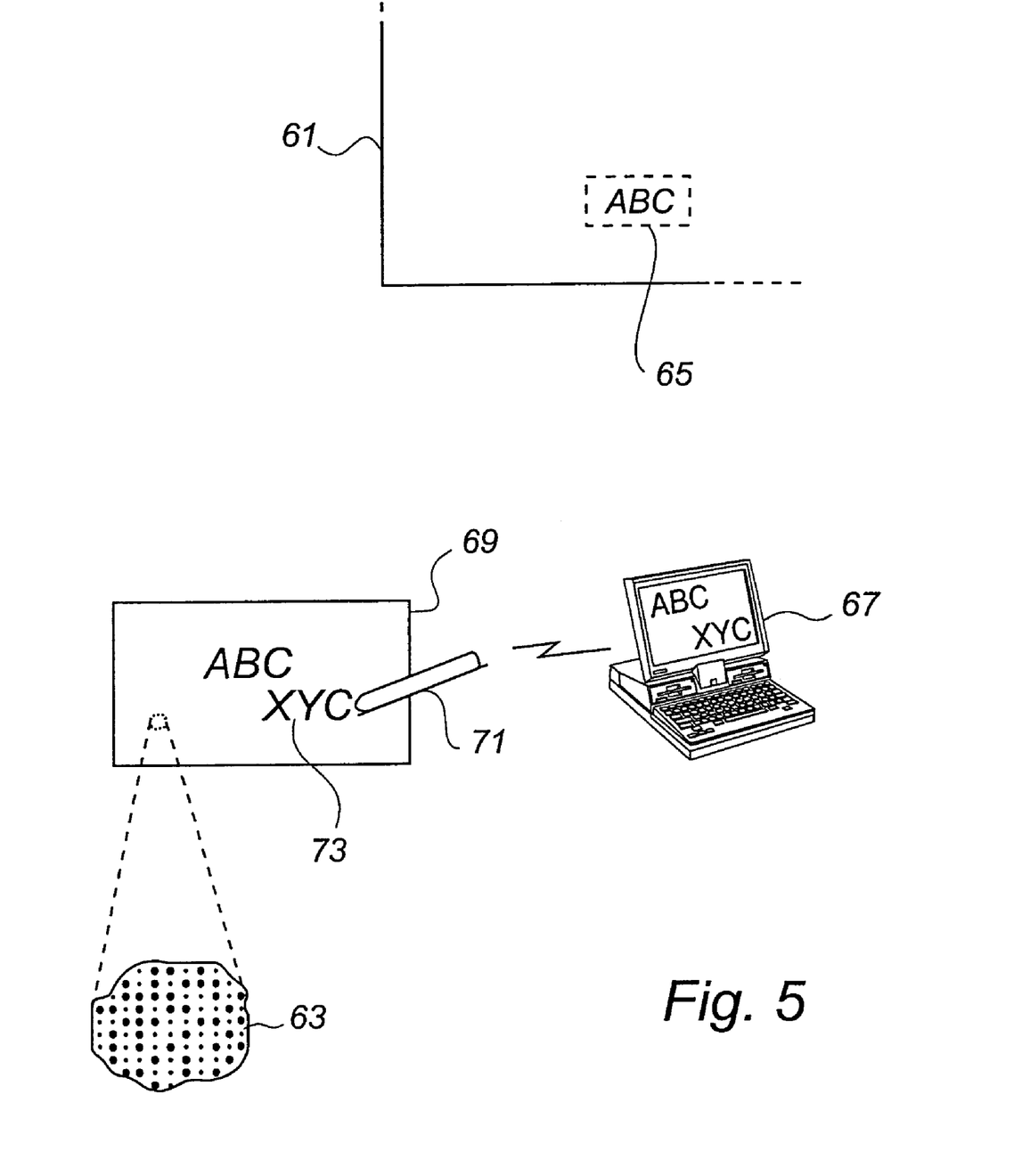
FIG. 5 illustrates the use of position coding in an exemplary embodiment of the present invention.

FIG. 5 shows the function of an embodiment of the invention using a position-coding pattern in graphical images. The pixel area 61 may contain a position-coding pattern 63, perhaps in a separate layer. Alternatively, the position-coding pattern 63 may be added to the information object 17 (FIG. 1) created in response to a user's request for a detailed view of a portion of the virtual pixel area 9. Or the position-coding pattern can be added by the user's computer 67 to any image received or displayed to the user by the user's computer.

When the user prints out a requested partial area on a local printer, the position-coding pattern 63 may appear on the printed-out area 69. The position-coding pattern 63 can be of such a type as shown in the applicant's Patent Application Numbers WO 00/73983 and PCT/SE00/08195, the technical disclosures of which are hereby incorporated herein by reference. Moreover, the technical disclosure of Patent Application Number WO 01/16691 is also hereby incorporated herein by reference.

As described in these disclosures, each position may be encoded by a number of symbols or one symbol may be used to encode a number of positions. The position-coding pattern 63 shown is constructed as shown in WO 00/73983, where a large dot represents a "one" and a small dot represents a "zero". It is, however, also possible to design the position-coding pattern 63 as described in SE00/01895, where different displacements of a dot in relation to a raster point encode different symbol values.

An optical sensor in a drawing device 71 may detect positions on the printed area 69 utilizing the position-coding pattern 63. When the drawing device 71 is moved relative to the area 69, the optical sensor in the drawing device may detect a series of positions on the area 69. The drawing device 71 may transmit this series of positions to the user's personal computer 67. While an optical sensor detects the movement of the drawing device 71 over the position-coding pattern 63, the drawing device may also deposit an ink trace on the surface having the position-coding pattern to enable the user to see the past movement of the drawing device over the surface.

The transmission of the position information may be carried out using various types of cable or by means of an infrared link. A short-range radio link (such as the BLUETOOTH protocol) may also be used. The position information may be transmitted as a set of pairs of coordinates, but the drawing device could instead convert the series of pairs of coordinates into a polygon train before transmittal.

When the user draws on the printed-out area 69 with the device 71, an application in the user's personal computer 67 can determine what was drawn (e.g., message 73) based on the position information forwarded by the device. The message 73 that the user drew may then be used to update the virtual pixel area 61 in the information service. Through use of a position-coding pattern 63 and the drawing device 71, the information service can be released from text format, enabling the user to update the virtual pixel area 61 with more expressive messages.

As a further possibility, the user may map a position-coded base he already has in his possession against a partial area that he has downloaded. Thereafter, messages may be added to a partial area which has been downloaded by writing on the base with a drawing device 71 in the manner described above.

The scope of the patent protection applied for is not restricted to the embodiments described above. The invention can be varied and changed in a number of ways within the framework of the following patent claims.

Concurrently filed with the application for this patent are applications entitled Systems and Methods for Information Storage based on Swedish Application No. 0000947-2, filed Mar. 21, 2000, and U.S. Provisional Application No. 60/207,839, filed May 30, 2000; Secured Access Using a Coordinate System based on Swedish Application No. 0000942-3, filed Mar. 21, 2000, and U.S. Provisional Application No. 60/207,850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,121, filed Jan. 12, 2001; and a new U.S. Provisional Application entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A method for providing an electronic information service in a computer system connected to a network, the method comprising:

creating a first information object comprising a partial area of a virtual pixel area into which a plurality of users can write information and from which the plurality of users can read information, said first information object including a position-coding pattern having sufficient resolution to define a track of a drawing device when the drawing device is moved over the position-coding pattern;

transmitting the first information object via the network to a first user included in the plurality of the users;

receiving a second information object from the first user including a modification of at least part of the partial area of the virtual pixel area, said second information object comprising position information obtained from the position-coding pattern; and updating the virtual pixel area utilizing the second information object, wherein the position information obtained from the position-coding pattern is used to provide a graphical image that is not in text format and which is created by moving the drawing device over the position-coding pattern.

2. The method of claim 1, further comprising receiving a request from the first user for the partial area of the virtual pixel area.

3. The method of claim 1, further comprising receiving a request from the first user for the partial area of the virtual pixel area, and wherein creating the first information object comprising the partial area of the virtual pixel area comprises creating the first information object in response to the request from the first user.

4. The method of claim 1, wherein the virtual pixel area includes a background image.

5. The method of claim 1, wherein creating the first information object comprises including a background image in the first information object.

6. The method of claim 1, wherein the virtual pixel area comprises a plurality of graphical files.

7. The method of claim 1, wherein creating the first information object comprises including an information image in the first information object.

8. The method of claim 1, further comprising selecting an information image based on user parameters specific to the first user, and wherein creating the first information object comprises including the information image in the first information object.

9. The method of claim 1, wherein creating the first information object comprises including a banner ad in the first information object.

10. The method of claim 1, wherein creating the first information object comprises including a banner ad targeted to the first user in the first information object.

11. The method of claim 1, further comprising notifying a second user when the virtual pixel area has been updated.

12. The method of claim 1, further comprising notifying a second user if a portion of the virtual pixel area specified by the second user is updated as a result of updating the virtual pixel area utilizing the second information object.

13. A computer-readable medium having computer-executable instructions for performing the method of claim 1.

14. A computer system adapted to perform the method of claim 1.

15. A method for providing an online graphical message service, the method comprising:
    receiving from a first user a request for at least a portion of a graphical image;
    transmitting the portion of the graphical image and a position-coding pattern over a computer network to the first user, the position-coding pattern having sufficient resolution to define a track of a drawing device when the drawing device is moved over the position-coding pattern;
    receiving over the computer network a modification of the graphical image from the first user, said modification comprising position information obtained from the position-coding pattern;
    updating the graphical image to include the modification; and
    making the updated graphical image available for viewing and modification by a second user, wherein
    the position information obtained from the position-coding pattern is used to provide a graphical image that is not in text format and which is created by moving the drawing device over the position-coding pattern.

16. The method of claim 15, further comprising transmitting the modification to a second user who has previously been provided with a portion of the graphical image affected by the modification.

17. The method of claim 15, wherein the position-coding pattern is detectable by an optical sensor for identifying locations on the portion of the graphical image.

18. The method of claim 15, wherein receiving over the computer network the modification of the graphical image from the first user comprises receiving a set of locations determined with respect to the position-coding pattern having a known relationship to the portion of the graphical image.

19. The method of claim 15, wherein a plurality of graphical files represent sections of the graphical image.

20. The method of claim 15, further comprising transmitting a banner ad to the first user.

21. The method of claim 15, further comprising transmitting to the first user a banner ad whose content is targeted to the first user.

22. A computer-readable medium having computer-executable instructions for performing the method of claim 15.

23. A computer system adapted to perform the method of claim 15.

24. A method for providing an electronic information service in a computer system connected to a network, the method comprising:
    receiving a message from a user comprising position information obtained from a position-coding pattern having sufficient resolution to define a track of a drawing device when the drawing device is moved over the position-coding pattern;
    receiving from the user an indication of a position for the message on a virtual area;
    placing the message in the position on the virtual area; and
    making at least portions of the virtual area available for viewing and modification by a second user, wherein
    the position information obtained from the position-coding pattern is used to provide a graphical image that is not in text format and which is created by moving the drawing device over the position-coding pattern.

25. The method of claim 24, wherein the message has associated therewith a fixed time period in which the message will remain in said position on the virtual area, the method further comprising:
    removing the message from said position on the virtual area after elapse of said fixed time period.

26. A computer-readable medium having computer-executable instructions for performing the method of claim 24.

27. A computer system adapted to perform the method of claim 24.

28. A method for participating in an online graphical message service, the method comprising:
    sending a request over a computer network to a computer server for at least a portion of a graphical image that is available for modification and viewing by a plurality of users;
    receiving the portion of the graphical image over the computer network;
    displaying the portion of the graphical image to a first user included in the plurality of users together with a position-coding pattern, detectable by an optical sensor, in a known relationship to the portion of the graphical image;
    receiving a modification of the portion of the graphical image from the first user comprising a set of coordinates generated as a result of the first user moving an optical sensor over the position-coding pattern; and
    sending the modification over the computer network to the computer server.

29. The method of claim 28, wherein displaying the portion of the graphical image to the first user comprises displaying the portion of the graphical image on a computer monitor.

30. The method of claim 28, wherein displaying the portion of the graphical image together with the position-coding pattern to the first user comprises printing the portion of the graphical image with a printer.

31. A computer-readable medium having computer-executable instructions for performing the method of claim 28.

32. A computer system adapted to perform the method of claim 28.

33. The method of claim 1, wherein, the updated virtual pixel area utilizing the second information object has associated therewith a fixed time period in which the virtual pixel area will remain updated utilizing the second information object, the method further comprising:
    removing the second information object from the updated virtual pixel area after elapse of said fixed time period.

34. The method of claim 33, further comprising:
    visually indicating to all users of the electronic information service, via a non-numerical graphical representation, elapsing of said fixed time period in which the virtual pixel area will remain updated utilizing the second information object.

35. The method of claim 15, wherein the updated graphical image including the modification has associated therewith a fixed time period in which the updated graphical image including the modification will remain updated utilizing the modification, the method further comprising:
    removing the modification from the updated graphical image including the modification after elapse of said fixed time period.

36. The method of claim 35, further comprising:
    visually indicating to all users of the online graphical message service, via a non-numerical graphical representation, elapsing of said fixed time period in which the modification of the portion of the graphical image will remain updated utilizing the modification.

37. The method of claim 25, further comprising:

visually indicating to all users of the electronic information service, via a non-numerical graphical representation, elapsing of said fixed time period in which the message will remain in said position on the virtual area message.

38. The method of claim 28, further comprising:

making the modification of the portion of the graphical image available for viewing and modification by a second user, the modification of the portion of the graphical image having associated therewith a fixed time period in which the portion of the graphical image will remain modified; and removing the modification of the portion of the graphical image after elapse of said fixed time period.

39. The method of claim 38 further comprising:

visually indicating to all users of the online graphical message service, via a non-numerical graphical representation, elapsing of said fixed time period in which the modification of the portion of the graphical image will remain available for viewing and modification.

\* \* \* \* \*